United States Patent [19]
Angelo

[11] 4,404,628
[45] Sep. 13, 1983

[54] MULTIPROCESSOR SYSTEM

[75] Inventor: Bardotti Angelo, Peschiera Borromeo, Italy

[73] Assignee: Honeywell Information Systems Inc., Waltham, Mass.

[21] Appl. No.: 211,962

[22] Filed: Dec. 1, 1980

[30] Foreign Application Priority Data

Dec. 3, 1979 [IT] Italy ............................... 27787 A/79

[51] Int. Cl.³ .............................................. G06F 13/06
[52] U.S. Cl. ................................................... 364/200
[58] Field of Search ................................. 364/200, 900

[56] References Cited

U.S. PATENT DOCUMENTS

| | | | |
|---|---|---|---|
| 3,480,914 | 11/1969 | Schlaeppi | 364/200 |
| 3,551,892 | 12/1970 | Driscoll | 364/200 |
| 3,566,363 | 2/1971 | Driscoll | 364/200 |
| 4,000,485 | 12/1976 | Barlow et al. | 364/200 |
| 4,153,934 | 5/1979 | Sato | 364/200 |
| 4,253,144 | 2/1981 | Bellamy et al. | 364/200 |

FOREIGN PATENT DOCUMENTS

| | | | |
|---|---|---|---|
| 2011680A | 7/1979 | United Kingdom | 364/200 |
| 2020453A | 11/1979 | United Kingdom | 364/200 |

OTHER PUBLICATIONS

Electronic Design, vol. 26, No. 6, Mar. 1978, pp. 72-75.

*Primary Examiner*—Mark E. Nusbaum
*Assistant Examiner*—Jameson Lee
*Attorney, Agent, or Firm*—George Grayson; Nicholas Prasinos

[57] ABSTRACT

A multiprocessor system comprising a plurality of processors and a memory unit which are connected through a common bus whereby each processor communicates with the memory through the bus. Communication among processors is effected by storing in a plurality of memory zones the messages intended for the several processors. The memory zones are each dedicated to one processors, but are accessible to all the processors. The communication among processors is performed by sending a notify signal on the common bus which is identified only by the processor for which it is intended. The notify signal is acknowledged by the notified processor without interrupting its ongoing operation. The notified processor subsequently accesses the memory unit and reads the message in the appropriate memory zone.

1 Claim, 9 Drawing Figures

MULTIPROCESSOR SYSTEM

BACKGROUND OF THE INVENTION

1. Field of the Invention

This invention relates generally to data processing systems and more particularly to apparatus for enabling synchronization and information exchanges among independent asynchronous processors.

2. Description of the Prior Art

As the complexity of modern data processing units has increased, more control functions, formerly carried out by the central processing unit, have been delegated to other processing units. For example, it is now common for an input/output control subsystem to have its own control store for carrying out its required control functions. In like manner, it is now usual to connect to one another several central units and input/output control subsystems to constitute multiprocessor systems. In such multiprocessor systems, the several processes that the different processors carry out by themselves are not generally independent and it is therefore necessary for the different processors to communicate in order that the several processes go on in an orderly and synchronized way.

In the past communication apparatus among processors have been developed where the different synchronization information made use of both dedicated communication paths and dedicated resources (registers and read-write logic) in the several processors, without involving the working memory or memories of the system. This allows for the fast transfer of the required information, but it requires expensive and complex circuits and the use of conflict resolving logic when more than one processor is exchanging information at the same time or desires to use contemporaneously the same resource.

Alternately the working memory was used as an exchanging information buffer, thus realizing an independent communication network among processors only for the exchange of call and notification signals for calling a processor and notifying it of a memory address where the required information could be found. However this approach too has the disadvantage of requiring complex and expensive communication networks and additional mechanisms for conflict resolution. Conceptually the processor, to which the calling and notifying message is sent, is required to assume a subordinate or "slave" status as to the notifying processor ("master"). Besides it is necessary to arrange in the "slave" processor (and therefore in all the processors which can assume such status) resources able to receive the notifying "vector", that is, the whole notifying information as, for instance, the calling processor name and the memory address where the notifying information can be found. If such resources are not exclusively "dedicated" to this function, such resources can be busy in other tasks and the notification cannot be accepted. In this case the slave must signal with suitable messages if the notification has been accepted or not. Such an approach is, for instance, described in U.S. Pat. No. 4,000,485.

SUMMARY OF THE INVENTION

The disadvantages of the prior art embodiments are overcome by the present invention. According to the invention a common resource or memory is provided which comprises zones dedicated to each system processor and accessible by each processor. Each processor includes means for sending a notifying signal and the name of the notified processor to all the system processors. Each processor also includes means for recognizing its name. The notifying signal is received by the notified processor and latched in a flip-flop without interferring with the activity of the notified processor. In other words, the notified processor is not required to set itself in a "slave" state. These operations are carried out by using a system channel or common bus without resorting to dedicated communication paths. The means which control the notified processor operations detect during suitable phases of its development and in a completely autonomous way as to the notifying signal generation the presence of such signal. At this point the notified processor can access the memory zone dedicated to it and go on with the reading and the interpretation of the message intended for it. Besides, if several messages are notified to a processor before it takes them into account, the notified processor can decide which order to follow in taking such messages into account on the basis of appropriate criteria. A further advantage offered by the invention is therefore to obtain a great flexibility in handling the messages, which otherwise would be rigorously considered on a timing priority basis.

BRIEF DESCRIPTION OF THE DRAWINGS

These and other features of the invention will appear more clearly from the description of a preferred embodiment of the invention and from the attached drawings where.

DESCRIPTION OF THE PREFERRED EMBODIMENT

Figure 1:
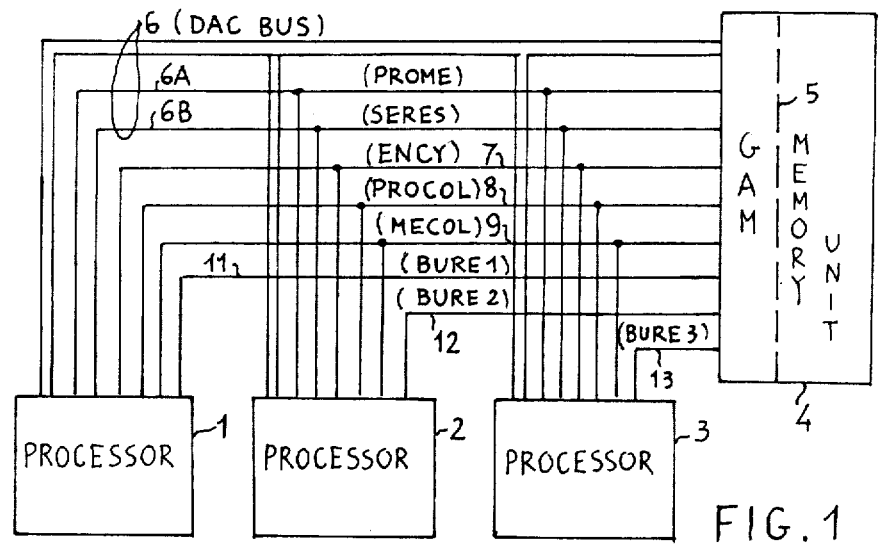
FIG. 1 shows in block form a multiprocessor system architecture with a common bus.

FIG. 1 shows in block diagram the architecture of the multiprocessor system and the bus interconnecting the several units. The system consists of three units or processors 1, 2 and 3 (generally N processors) and a working memory 4 to which a memory access controller GAM 5 is coupled. The different units 1, 2 and 3 and GAM 5 are interconnected by means of a common bus system comprising a suitable number of leads.

The system bus allows for the information transfer from any processor to the working memory and vice versa. The information transfer can be started by any processor in a synchronous way and involves bus occupation for the time required by the transfer. The function of GAM 5 is to settle the conflicts among several processors which want to occupy the bus at the same time and allow bus access to one processor at a time according to appropriate priority criteria. An information transfer, in fact, can be made between memory and only a processor each time. According to the invention the common bus allows for direct exchange of notifying signals among several processors without involving the memory. Following such exchanges the notified processors can successively read in the memory the messages intended for them and previously stored in suitable memory zones. In such way the message exchange among processors is possible without the notified processors having to assume a subordinate state as to the notifying processors.

The system bus comprises:—a group of leads 6 for the transfer of data-addresses—commands and possibly check bits, such group totally comprising, for instance, 72 leads (4 data bytes, 2 address bytes, 1 command byte and 1 check bit for each byte). Such group of leads 6, named DAC-BUS, is bidirectional; each unit such as 1, 2, 3 and 4 is coupled to DAC-BUS by means of interface circuits which can both receive and transmit signals. In the rest condition the transmitting circuits have a virtually infinite output impedance so the DAC-BUS leads are virtually disconnected from the units. In the work condition the transmitting circuits can apply to the leads one of the two electrical levels corresponding to two logical levels 0 or 1.

In the following, unless otherwise specified, the convention will be adopted in which logical level 1 is a high electrical level and logical level 0 is a low or zero electrical level. Such levels can be detected by all receiving units. Logical transmitting circuits of such kind are known as TRISTATE-DRIVERS and are available on the market so that any related additional information on such circuits is not essential for understanding the present invention. A group of leads 7, 8 and 9 is provided for the transfer of signals controlling the signals of dialogue between processors and memory, such signals being respectively named ENCY, PROCOL and MECOL. These leads couple the several units 1, 2, 3 and 4 with an interconnection of the type known as "open collector". As explained later on, such type of interconnection requires the interconnection line be connected to an appropriate voltage source through a resistor. In each unit the line is connected to a receiver with relatively high impedance. In at least a unit such line is connected to an open collector transmitter which can connect said line to ground or virtually disconnect it so as to apply to such line an electrical and logical level 0 or 1, respectively. Clearly it suffices that one of the several transmitters connects the line to ground to obtain the electrical/logical level 0 on the whole line and to have it detected by the several receivers. A group of leads 11, 12 and 13 is provided which individually couple each unit 1, 2 and 3 with GAM 5 through an open collector coupling. Such leads are used both to send to GAM 5 bus access request signals, named BURE 1, BURE 2 and BURE 3 respectively, and to receive from GAM 5 its consent. Within DAC-BUS 6 there are two leads 6A and 6B used for the transfer of two commands named PROME and SERES respectively. Such leads allow for the exchange of a notifying signal among several processors.

Figure 2:
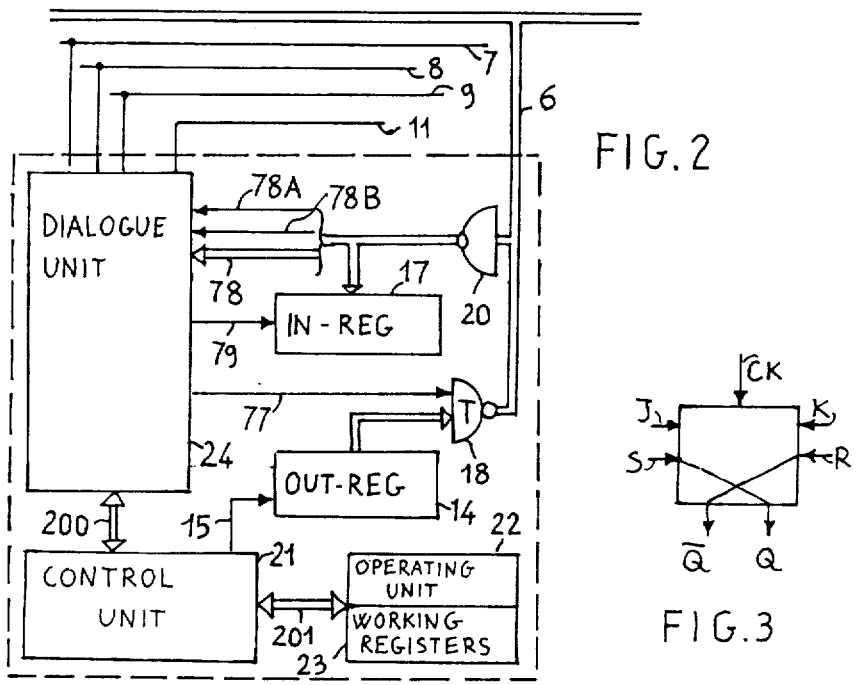
FIG. 2 shows in block form the logic architecture of each processor.

FIG. 2 is a block diagram of the architecture of a processor such as unit 1, 2 or 3 of FIG. 1. The unit or processor comprises two interface registers for the storing of the received information and of information to be tansmitted on the bus, namely DAC-BUS 6. A register 14 (OUT-REG) is used as an output register for data output to the DAC-BUS and register 17 (IN-REG) is used as an input register for data input from DAC-BUS 6. Register 14 outputs are coupled to the inputs of a TRISTATE transmitter set 18 whose outputs are coupled to DAC-BUS 6. Register 17 inputs are coupled to DAC-BUS 6 through a set of receivers 20.

The processor comprises further a control unit 21, an operating unit 22, a working register set 23, and an interface dialogue unit 24. The control unit 21 sends a control signal to register 14 through leads 15 to enable the register to store information to be transferred to DAC-BUS 6. It also sends suitable commands to the operating unit and the working registers through communication path 201 and to the interface dialogue unit 24 through communication path 200. Control unit 21 also receives in turn signals from dialogue unit 24, operating unit 22, and working registers 23. The interface registers 14 and 17 communicate through suitable paths (not shown) with working registers 23 and operating unit 22. Dialogue unit 24 is connected to system BUS leads already shown in FIGS. 1, 7, 8, 9 and 11 (or 12 or 13). In addition, dialogue unit 24 enables transmitter set 18, through a signal on lead 77, and provides the loading of register 17, through a signal on lead 79. Dialogue unit 24 receives further directly from output of receivers 20, some information present on DAC-BUS 6, including the ones present on leads 6A and 6B, through bus 78 and leads 78A and 78B respectively. A detailed description of the architecture of a processor such as the one of FIG. 2 is not essential for the invention understanding as such architecture can be made in several ways even very different from each other; therefore such description is omitted. A more detailed description of the embodiment can be found, for instance, in U.S. Pat. No. 3,710,324.

Figure 3:
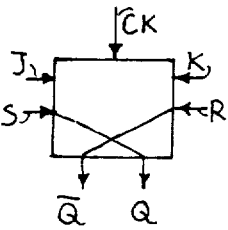
FIG. 3 shows the conventional symbol used to evidence J-K flip-flops.

The architecture of dialogue and priority unit 24, contained in each processor, as well as of the working memory 4 with particular reference to GAM 5, will however be considered in detail. Before going on with the description, it is feasible to mention the operation of bistable circuits or J-K flip-flops, owing to their large use in the following description. FIG. 3 shows the conventional representation diagram generally used for such a flip-flop which is available on the market as an integrated circuit. The J-K flip-flop is a bistable circuit provided with a timing clock input CK, with two direct or set-reset asynchronous inputs S and R, with two synchronous or clock conditioned inputs J and K, and with two outputs Q* and Q. For purposes of this specification the symbol Q* will be used to indicate the invented output of a flip-flop instead of the conventional symbol $\overline{Q}$. A signal applied to S, R inputs activates the flip-flop putting it permanently in one of two possible electrical status. Signals at the J,K inputs activate the flip-flop only when the trailing edge of a positive electrical/logical pulse is applied to input CK. The following table summarizes the flip-flop operation.

| Inputs | | | | | Outputs | |
| --- | --- | --- | --- | --- | --- | --- |
| S | R | CK | J | K | Q | Q* |
| L | H | X | X | X | H | L |
| H | L | X | X | X | L | H |
| L | L | X | X | X | H | H |
| H | H | L | L | L | $Q_o$ | $Q_o*$ |
| H | H | L | H | L | H | L |
| H | H | L | L | H | L | H |
| H | H | L | H | H | toggle; | |
| H | H | H | X | X | $Q_o$ | $Q_o*$ |

In the table, L stands for the electrical/logical level 0 present at the corresponding input/output; H stands for a electrical/logical level 1; and X stands for an indifference condition. $Q_o$ and $Q_o*$ stand for the state of Q and Q* outputs before the signals are applied.

For instance, it can be seen that both the two inputs S and R must be at logical level 1 to have the flip-flop activated by clock pulse (CK=L). Later on, for sake of clearness, flip-flop J,K will be evidenced in the several figures as in FIG. 3 without utilizing reference letters. Always for sake of clarity, the possible leaving out of any indication on some inputs, particularly J,K inputs, will means that an appropriate electrical signal "1" or "0", suitable to obtain the desired behaviour, is permanently applied to such inputs.

Figure 4:
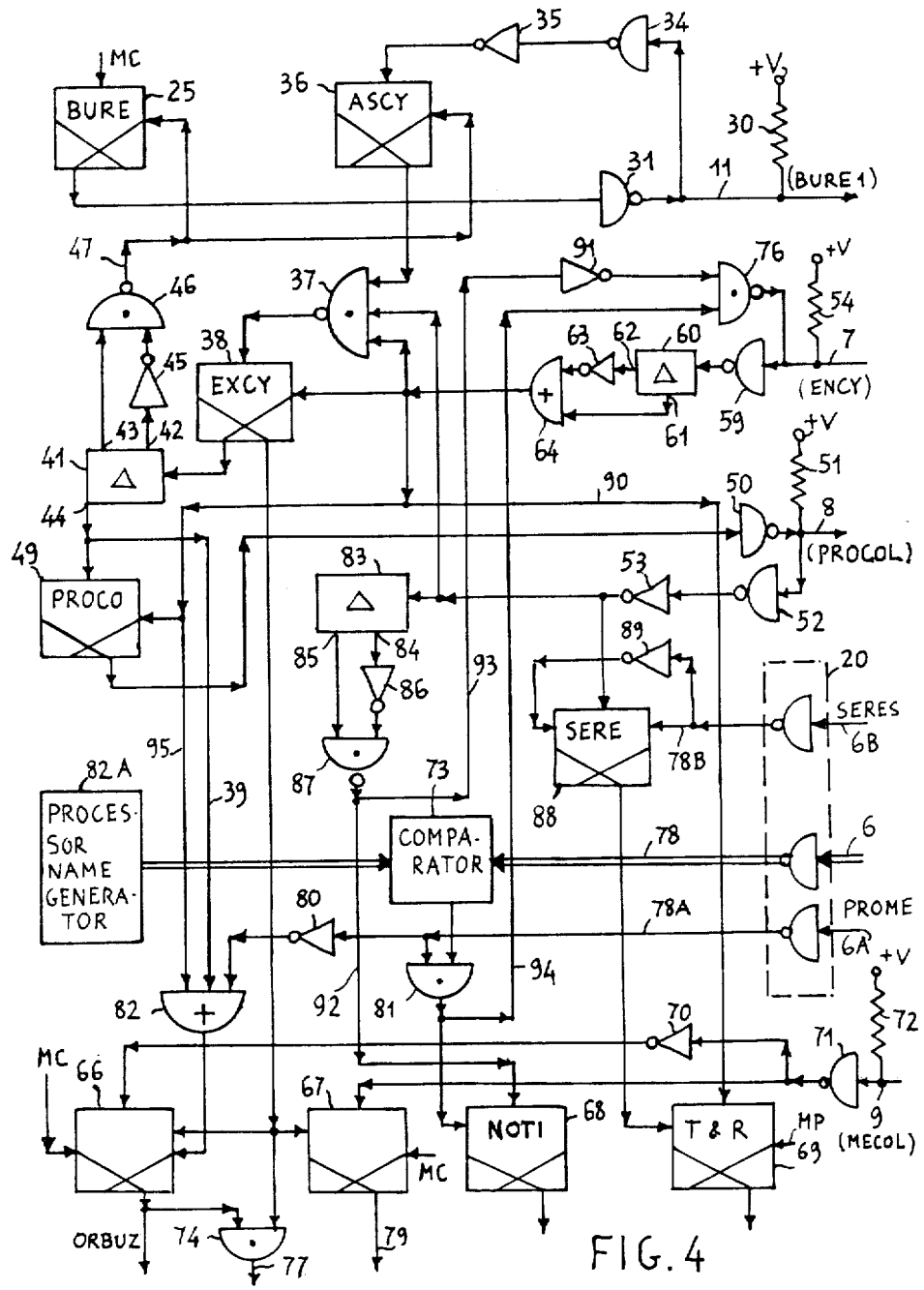
FIG. 4 shows the logic diagram of the dialogue unit included in each processor.

FIG. 4 shows in detail a preferred embodiment of a dialogue unit 24 contained in each processor 1, 2 or 3 of FIG. 1 and particularly referred to processor 1. The unit 24 has the function to enable both the information exchange between processor 1 and memory 5, and the exchange of notify signals among processor 1 and any other processor of the system. In addition, dialogue unit 24 is able to receive the notify signal from any of the other processors. Unit 24 comprises a J-K flip-flop 25 (BURE) which receives at clock input a microcommand MC, coming from control unit 21 (FIG. 2). The inverted output Q* of flip-flop 25 is connected to the input of an open collector receiver/inverter 31. The output of receiver/inverter 31 is connected to the system bus lead 11. Lead 11 is connected to a +V voltage source through a resistor 30 and it is coupled with GAM 5 at the other end. Flip-flop 25 is normally reset; it is therefore clear that its inverted output is at logical level 1; thus lead 11 (BURE 1) is normally at logical level 0. When processor 1 requests access to the bus, its control unit 21 produces a pulse command MC, in asynchronous way relative to the system operation (though inside the processor the event may occur at a predetermined instant of its machine cycle). Lead 11 rises to logical level 1 and signals to GAM 5 that processor 1 wants to access to the bus (signal, BURE 1 at 1). With such signal, processor 1 does not access to the bus as the bus may be already engaged by other processors or as other processors may present concurrently their access request to the bus. As explained later on the conflict resolution among requesting processors is effected by GAM 5.

Going on with the dialogue unit 24 description, it will be noted that lead 11 is coupled, through receiver/inverter 34 and NOT 35, to the clock input of a J-K flip-flop 36 (flip-flop ASCY). This is because in the preferred example of the embodiment lead 11 is used for a bidirectional exchange of signals to minimize the number of BUS leads, as described in Italian Patent Application No. 23037 A/78, filed by the same assignee, on May 5, 1978. As described in such application, GAM 5 answers the requesting processors by dropping the BURE signal on lead 11 to logical level 0 when it has decided to allow such processor to access the BUS. This causes flip-flop 36 (ASCY) to be set. It is however clear that the answer to the processor could be sent on a separate lead, other than lead 11. Direct output Q of flip-flop 36 is connected to a first input of a three input circuit NAND 37, whose output is connected to the clock input of a J-K flip-flop 38 (flip-flop EXCY). Enabling signals, which will be considered later on, are applied to the other two inputs of NAND 37. They enable the signal transfer from output Q of flip-flop 36 to the clock input of flip-flop 38 only when the BUS is really free.

In fact in the described embodiment the cycle assignment operations can overlap the execution and finishing of the possible previous cycle to minimize the information transfer rate on the BUS. Then, when flip-flop 36 (ASCY) is set, once the execution of the possible previous cycles is completed, flip-flop 38 is set and BUS occupation and information transfer starts. The Q* output of EXCY is connected to the input of delay line 41 having output taps 42, 43 and 44. The signal trailing edge at the Q* output of EXCY (consequent to the setting of EXCY) propagates along such line.

Output 42 is connected to the input of a NOT 45. Output 43 and the NOT 45 output are connected to the inputs of a two input NAND gate 46. When the delay line is inactive (EXCY reset) the outputs 43 and 42 are at logical level 1 and NOT 45 output is at logical level 0. Therefore NAND 46 output is normally at logical level 1. When the trailing edge propagates along line 41, output 42 drops to logical level 0 before output 43. Thus NOT 45 output rises to logical level 1, while output 43 is still at logical level 1 and a pulse at logical level 0 appears at NAND 46 output. The NAND gate 46 output is connected both to the reset input of flip-flop 36 (ASCY) and to the reset input of flip-flop 25 (BURE) through lead 47.

The output 44 of delay line 41 is connected to the clock input of flip-flop 49 (PROCO). Therefore with the set of flip-flop EXCY, flip-flop 36 (ASCY) and flip-flop 25 are reset and immediately afterwards flip-flop 49 (PROCO) is set. The direct output Q of flip-flop 49 is connected to the input of an open collector inverter/driver 50 whose output is connected to system BUS lead 8 to apply PROCOL signal thereto. Lead 8 is connected to a +V voltage source through a resistor 51, therefore it is normally at logical level 1 but it goes to logical level 0 when flip-flop 49 is set. It is to be noted that if PROCOL was previously at logical level 0, because flip-flop 49 was already set, or because the corresponding flip-flop of any other system processor was already set, flip-flops 38 (EXCY) and 49 (PROCO) set would have been prevented till PROCOL would have gone to logical level 1. In fact, lead 8 is connected to the input of an inverter/receiver 52 whose output is connected to the input of a NOT 53. The output of NOT 53 is connected to the second input of the already considered NAND 37. Therefore the set of flip-flop 38 is conditioned (inter alia) by the presence of a logical level 1 on lead 8 (PROCOL). Flip-flops 38 (EXCY) and 49 (PROCO) are reset as follows. Line 7 ends in each processor with a receiver/inverter 59 and with an open collector NAND 76. Line 7 is normally held at logical level 1 by GAM 5 and by the several processors, this level being dropped to 0 near the end of a BUS occupation cycle and rising again to 1 at the cycle end. The output of receiver 59 is connected to the input of a delay line 60 having output taps 61 and 62. Intermediate tap 61 is connected to a first input of a two input OR 64. Tap 62 is connected to the input of a NOT 63, whose output is connected to the second input of OR 64. The output of OR 64 is connected to the reset input of flip-flops 38 and 49.

When delay line 60 is at rest (ENCY at logical level 1) its outputs are at logical level 0, and the output of OR 64 is at logical level 1. When ENCY falls to logical level 0 the rising edge at the receiver 59 output propagates from input to outputs of line 60 and brings output 61 to logical level 1 before output 62 goes to 1. OR 64 output remains at logical level 1.

On the contrary when ENCY rises back to logical level 1, it is easy to see that a short pulse at logical level 0 appears at OR 64 output. This pulse is suitably delayed relative to ENCY leading edge, and resets flip-flops 38 and 49. It is clear that only a processor at a time will have flip-flops such as 38 and 49 set but the ENCY command is clearly forwarded to all the processors. Dialogue unit 24 comprises further some flips-flops which describe the status of interface registers aand store the occurrence of particular events on the interconnection BUS. These are flip-flops 66, 67, 68 and 69. When flip-flop 66 is set it indicates that output register 14 has been loaded and it is busy, that is, contains information to be transferred on the DAC-BUS 6. This status is accessible to control unit 21 through a direct output of flip-flop 66 which transmits to control unit 21 an ORBUZ signal indicating that OUT REG is loaded.

When flip-flop 67 is set it enables the loading of input register 17 with the information present on DAC-BUS 6 through lead 79 connected to its direct output. The same lead 79 is used to indicate to the control unit that input register 17 has been loaded. Direct output Q of flip-flop 38 (EXCY) is connected to the K input of flip-flop 66, to the J input of flip-flop 67 and to a first input of an AND gate 74 through lead 75. The clock input of flip-flop 66 is connected to the output of a NOT 70 whose input is connected to the output of a receiver-/inverter 71. The clock input of flip-flop 67 is directly connected to the output of receiver/inverter 71. The input of receiver 71 is connected to lead 9 on which a MECOL signal, normally at logical level 1 is received from GAM 5. Lead 9 is held at logical level 1 by a "pull up" resistor 72. The set input of flip-flop 66 and the reset input of flip-flop 67 receive the MC microcommand from control unit 21; this is the same microcommand which sets flip-flop 25 and enables, through lead 15, the loading of register 14. When the processor wants to access the BUS, it arranges the suitable information loading (data, commands, addresses) in register 14 and at the same time, sets the two flip-flops 25 (BURE) and 66. When the channel is assigned to the requesting processor (flip-flop 38 is set) the information stored in register 14 is transferred on DAC-BUS 6 through TRI-STATE 18 circuits enabled by the output of AND 74 circuit (lead 77). In fact AND 74 has its two inputs coupled with the direct outputs of the two flip-flops 38 and 66 and it enables TRISTATE 18 circuits with output 77. On DAC-BUS 6 the information is therefore present beginning with the lowering of PROCOL signals until memory 4 answers by lowering MECOL signal thus causing the reset of flip-flop 66. Likewise flip-flop 67, when reset, causes the loading of register 17 through a signal at logical level 1 on its direct output connected to lead 79 and indicates that to the control unit. In fact flip-flop 67 is set by the rising edge of MECOL signal which occurs when memory 4 has put on DAC-BUS 6 the data to be loaded into register 17. The MECOL signal is produced by a memory circuit block when the information transfer requires a read or write operation of the memory and therefore involves one of the processors and the memory.

However, as it will be shown later on, in case of communication among processors memory is not involved in the information transfer and the MECOL signal is not produced. It is therefore necessary to arrange a second reset circuit for flip-flop 66 considering such possibility. Likewise the ENCY signal is normally produced by the memory. In case of communication among processors the memory does not produce any ENCY signal and this one must be produced by the notified processor. Therefore an ENCY signal generation circuit and a second reset circuit for flip-flop 66 must be provided in each processor. Such considerations lead to a more detailed description of the processor notifying or communication mechanism. When a processor wants to notify information to another processor it previously stores into memory the message to be transferred, using the normal transferring mechanism from processor to memory. Later on such aspect will be considered in detail.

Then the processor loads into register 14 a code corresponding to the notified processor name and a control PROME bit at logical level 0 indicating that the required transfer does not involve the memory. Once the access to DAC-BUS 6 has been obtained, such information is available to all the processors connected to the BUS through receiving circuit without register interposition. In each processor a name generator device is arranged. Such device can be a register or a key set which can be manually pre-arranged and which applies to a suitable number of leads, electrical level 1 or 0 corresponding to the name of each processor. The code on the BUS is compared in a comparison network available in each processor with the processor name determined by the name generator. For that processor and only for that one, for which its name and the code on the BUS coincide, the comparison network emits a positive comparison signal which, conditioned by the presence of PROME signal at logical level 0, sets a notifying flip-flop and causes the generation of the signal ENCY of cycle end.

FIG. 4 shows that the dialogue logical comprises a group of keys 82A and a comparator circuit 73. The output of the key set is connected to a first input set of a comparator 73. Comparator 73 receives at a second input set, which is connected to channel 78 through a set 20 of receivers/inverters, the name of the notified processor present on the DAC-BUS 6. The output of comparator 73 is coupled with an input of a two input AND 81. The second input of AND 81 is connected to lead 78A which receives through a receiver/inverter of set 20 the PROME signal. When the PROME signal is at logical level 0 and the comparison between the notified name and the processor name matches, the output of AND 81, connected to the J input of flip-flop 68, applies to such input a logical level 1. The set of flip-flip 68 is obtained by means of a signal derived from the PROCOL signal. The output of NOT 53 is coupled with the input of a delay line 83 having a plurality of taps 84 and 85. First tap 84 is connected to the input of a NOT 86. The NOT 86 output is connected to an input of a two input NAND 87. Second tap 85 of the delay line is directly connected to the second input of NAND 87. The set including delay line 83, NOT 86 and NAND 87 forms a pulse generator. It is easy to see that when a PROCOL signal on lead 8 drops to logical level 0 a short pulse at logical level 0 appears at the outut of NAND 87 with a certain delay due to line 83 characteristics.

The output of NAND 87 is connected, through lead 92, to the clock input of flip-flop 68 and sets it if the logical level at J input is 1. This occurs to the notified processor (PROME at logical level 0 and matched comparison between notifying code or name and processor name). The output of NAND 87 is further connected, through lead 93, to the input of a NOT 91 whose output is connected to an input of an open collector NAND 76. The output of AND 81 is connected, through lead 94, to a second input of NAND 76. As already said, NAND 76 output is connected to lead 7. Therefore, through elements 91 and 76, a notified processor generates a short pulse ENCY at logical level 0 on lead 7 normally held at logical level 1 by a "pull up" resistor 54. Such pulse reaches all the processors through lead 7. The notifying processor which started the transfer cycle of the notify message receives the pulse through its receiver 59 and resets its flip-flops 38 (EXCY) and 49 (PROCO). It is to be noted that the output of OR 64 is connected both to the reset input of flip-flops 38 and 49, and through lead 95 and circuit OR 82, to the reset input of flip-flop 66. Circuit OR 82 has a second input connected to a NOT 80 output, whose input in its turn is connected to lead 78A, and a third input connected through lead 39 to the output 44 of delay line 41. Therefore, when PROME signal is at logical level 0, the second input of OR gate 82 is at logical level 0, the third input of OR gate 82 is at logical level 0 in the notifying processor, and the pulse at logical level 0 coming from OR 64 output is transferred to the output of OR gate 82 and resets flip-flop 66. When PROME signal is at logical level 1, the output of NOT 80, at logical level 1, makes the reset pulse applied to flip-flop 66 through OR 82. Independently from PROME signal level, output 44 of the delay line 41 masks the reset pulse applied to flip-flop 66 in all the processors which did not have access to the BUS during the outstanding cycle.

To complete the description of dialogue unit 24, some of its circuits will be mentioned, though they are not directly involved in the information transfer process between processors and memory or in the notification among processors. The circuits are two flip-flops 69 and 88 and some logical elements coupled to them. Flip-flop 88 (SERE) has its clock input connected to the output of NOT 53 through which it receives PROCOL signal. The K input of flip-flop 88 is connected, through lead 78B, to the output of a receiver/inverter of a group 20 and receives through it a SERES signal present on lead 6B. The J input of flip-flop 88 is connected to lead 78B through NOT 89. Therefore, if SERES signal on lead 6B is at logical level 1, flip-flop 88 is set or maintained in set by the trailing edge of PROCOL signal, while it is reset or maintained in reset if SERES signal is at logical level 0. The direct output Q of flip-flop 88 is connected to the J input of flip-flop 69. The clock input of flip-flop 69 is connected, through lead 90, to the output of OR gate 64. Therefore, with the reset of flip-flops 38 and 44, flip-flop 69 (T&R) is set if during the same cycle flip-flop 88 has been set. Flip-flop 69 is reset by a microcommand MP. The function of flip-flop 69 will be considered later on.

Figure 5:
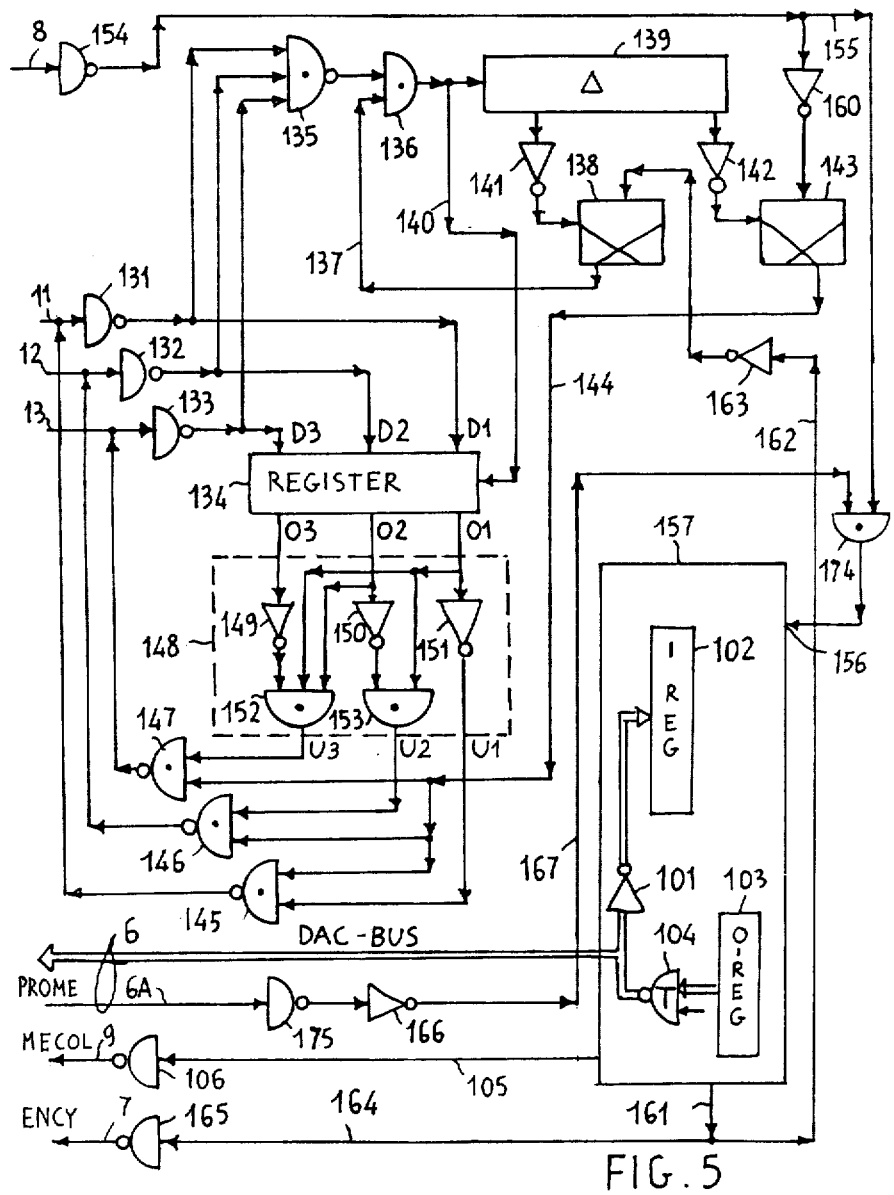
FIG. 5 shows the memory unit of the system with reference to the priority assignment logic for accessing the bus and the memory.

Having described in detail the dialogue handling unit of the several processors, it is now useful to describe the system memory unit 4 with particular reference to GAM 5 of such unit. FIG. 5 shows such unit. Lead 11 is connected to the input of a receiver/inverter circuit 131, lead 12 is connected to the input of a receiver/inverter circuit 132 and likewise lead 13 is connected to the input of a receiver /inverter circuit 133. The outputs of receivers 131, 132 and 133 are connected, on one side, to corresponding inputs of a NAND 135 and also to data inputs D1, D2 and D3 of a register 134 respectively. The output of NAND 135 is connected to one input of a two input AND 136. AND 136 receives at its second input, through lead 137, an enabling signal from output Q* of a J-K flip-flop 138. The output of AND gate 136 is connected to a multitapped delay line 139 and to the clock input of register 134, through lead 140. A first output tap of delay line 139 is connected to the input of an inverter or NOT 141 element, whose output is connected to the direct SET input of J-K flip-flop 138. A second output tap of delay line 139 is connected to the input of a NOT 142 whose output is connected to the direct SET input of a J-K flip-flop 143. The direct output Q of flip-flop 143 is connected, through lead 144, to the enabling input of three inverter/driver NAND gates 145, 146, and 147. The output of such NAND gates 145, 146 and 147 are connected to leads 11, 12 and 13 respectively. The signal input of the three NAND gates 145, 146 and 147 is connected to three outputs U1, U2 and U3 respectively of an exclusion logic matrix or priority network 148. Outputs 01, 02 and 03 of register 134 form the inputs of priority network 148.

In FIG. 5 the priority network comprises three NOT gates 149, 150 and 151, an AND gate 152 with three inputs, and an AND gate 153 with two inputs. Output 01 of register 134 is connected, through NOT 151, to output U1 of network 148 and it is applied to the signal input of inverter/driver 145. Output 01 is further connected to a first input of the two AND gates 152 and 153. Output 02 of register 134 is connected, through NOT 150, to a second input of AND 153 whose output U2 is connected to the signal input of NAND 146. Output 02 is further connected to a second input of AND gate 152. Output 03 of register 134 is connected, through NOT 149, to a third input of AND gate 152 whose output U3 is connected to the signal input of NAND 147.

The function of the exclusion logic matrix or priority network 148 is to assign a relative priority to the access requests of DAC-BUS 6 received from the several processors through leads 11, 12 and 13 and to enable the output from the network of the request with higher priority in case of several simultaneous requests. The shown priority network assigns, for instance, highest priority to access requests coming from processor 1 through lead 11, intermediate priority to access requests coming from processor 2 through lead 12, and lowest priority to requests coming from processor 3 through lead 13. It can be noted that a signal at logical level 0 on terminal tap 01 is transferred to output U1, where (owing to NOT 151) it appears in inverted form, say as a signal at logical level 1 without any conditioning.

A signal at logical level 0 present on terminal 02 is transferred to output U2 only if a signal at logical level 1 is present at the same time on terminal 01 which indicates that an access request with high priority is not present. Likewise a signal at logical level 0 present on terminal 03 is transferred to output U3 only if a signal at logical level 1 is present at the same time on both terminals 02 and 01. Taps 01, 02 and 03 represent the outputs of the register 134 cells corresponding respectively to inputs D1, D2 and D3 and devoted to store access requests received on leads 11, 12 and 13 respectively as information at logical level 0. The operation of memory interface circuits hitherto described is therefore clear.

When a processor, for instance processor 2, wants to access the memory, it rises the signal present on lead 12 to logical level 1. Therefore the output of receiver/inverter 132 falls to logical level 0, and the output of NAND gate 135 rises to logical level 1. If AND gate 136 is enabled because J-K flip-flop 138 is reset (as it will be seen later on, this means that memory cycles are not already in progress) logical level 1 is transferred to the output of AND gate 136 and it activates the loading of register 134 through lead 140. Logical level 0 present at the output of NAND 132 is loaded into the register together with the logical level present at the output of the other NAND gates 131 and 133. At the same time the logical level 1 present at the output of AND 136 is applied to the delay line 139 and propagates along it. When logical level 1 reaches the first tap, the output of NOT 141 falls to logical level 0 and J-K flip-flop 138 is set. Thus output Q* of flip-flop 138 falls to logical level 0 and this has the effect of disabling AND gate 136. Therefore possible following access requests are not transferred to the output of AND gate 136 and are not taken in account until flip-flop 138 is reset again.

When logical level 1, which propagates along delay line 139, reaches the second output tap, flip-flop 143 is set, through NOT 142. Thus, direct output Q of such flip-flop rises to logical level 1 enabling NAND gates 145, 146 and 147. The access request with higher priority among the possible ones previously stored by register 134, if that is the case, has been in the meantime presented to the output of priority network 148 as logical level 1. Supposing that a logical level 1 is present at output U2, the output of open collector NAND 146 falls to logical level 0. Therefore logical level 1 present on lead 12 is forced to 0 as answer and acceptance of the access request. At this point it is to be borne in mind that flip-flops 138 and 143 are set, that is, they have not been put in the initial reset status. However when the processor whose request has been accepted receives the acceptance response, it lowers signal PROCOL on lead 8 at logical level 0, thus indicating that it really accesses the memory. Logical level 0 present on lead 8 is received by the memory through receiver/inverter 154 whose output rises to logical level 1. The output of receiver/inverter 154 is connected, through lead 155 and AND gate 174, to an input 156 of a memory control logic block 157 and activates it if AND gate 174 is enabled. This block is not shown in detail because it is not essential for understanding the invention.

Block 157 also receives, through DAC-BUS 6, information representative of commands (for instance, write/read, diagnostic test) of memory addresses and of data to be written in the memory. The DAC-BUS, which is bidirectional, will be also used for sending back to the requesting processor memory state signals and readout data. The DAC-BUS is connected through a receiver/inverter set 101 to the inputs of an input register group 102 (I-REG). Lead 6A of DAC-BUS 6 is further connected, through a receiver/inverter 175, a NOT 166 and a lead 167, to an enabling/disabling input of AND gate 174. Lead 6A transfers the PROME command from the processor which accessed the DAC-BUS to the memory. If PROME is at logical level 1, AND gate 174 is enabled and the signal present on lead 155 is transferred to memory block 157 activating it. If PROME is at logical level 0, activation of the memory block does not occur. Another group of output registers 103 (O-REG) of logic block 157 has its outputs connected to the inputs of a TRISTATE NAND/-DRIVER group 104 whose outputs are connected to DAC-BUS 6. As soon as logical block 157 receives the signal at logical level 1 on lead 155, it enables the loading of registers 102 and starts the memory operations defined by the content of such registers. At the same time logical block 157 produces on output lead 105 a level 1, indicating the beginning of a memory cycle.

Lead 105 is connected to the input of an receiver/inverter 106 whose output is connected to BUS lead 9. Therefore, on such lead, signal MECOL falls to logical level 0 and informs the processor to which access to the bus has been granted that the memory cycle has started and that the information present on DAC-BUS 6 can be removed. In fact, as already seen with reference to FIG. 4, signal MECOL at logical level 0 causes the reset of flip-flop 66 and the disabling of driver group 18 (FIG. 2).

When the requested operation is completed and, for instance, in case of data read operation, the data is loaded together with other useful information into the register group 103 (O-REG), logic block 157 enables the driver group 104 to transfer such data and information on DAC-BUS and at the saame time it lowers again to 0 the signal present on lead 105. Signal MECOL on BUS lead 9 rises again to 1. As already seen, this causes the set of flip-flop 67 (FIG. 4) of the processor to which the cycle has been granted and enable the loading of the information present on DAC-BUS into register group 17 (FIG. 2). The output of receiver/inverter 154 is further connected, through inverter 160 to the clock input of flip-flop 143. Therefore as soon as PROCOL falls to logical level 0, the output of inverter 160 falls to logical level 0 and flip-flop 143 is reset. Consequently the logical level at direct output Q of such flip-flop falls to 0 and NAND gates 145, 146, 147 are disabled so that outputs are disconnected from ground and resume again the normal reset state. (It is to be recalled that NAND gates 145, 146, 147 are of the "open collector" type).

At the end of the memory cycle, or preferably some time before, for the reason which will be stated later on, the memory control logic block 157 produces on output lead 161 a cycle-end signal at logical level 1. The signal is applied, through lead 162 and the NOT 163, to the clock input of flip-flop 138 and resets it, thus enabling the transfer of new or still pending access requests through AND 136. Signal on lead 161 is further sent through lead 164 to the input of receiver/inverter 165 whose output is connected to BUS lead 7. Then signal ENCY on lead 7 falls to logical level 0 and signals to the several processors that the memory cycle in progress is ending. Signal ENCY is held at logical level 0 until the end of the memory cycle, that is, it rises to 1 when the memory is ready to begin a new cycle. As already described, the reset of flip-flops 38 and 49 of the dialogue unit in the processor to which the cycle has been assigned occurs with ENCY rising again to logical level 1. The previous description shows the operation of the memory circuits and of GAM 5 in case a processor requires an information transfer (read/write) involving the memory. In this case signal PROME at logical level 1 will be present among the processor commands sent on the DAC-BUS. The operation of GAM 5 is the same in case a processor wants to send a notifying signal to another processor. Even in this case the BUS will be assigned by GAM 5 to the notifying processor following the already described priority criterium. However, in such case, the signal PROME at logical level 0 is present among the signals sent by the processor through the DAC-BUS. Consequently no memory cycle is activated and no generation of signals MECOL and ENCY at logical level 0 occurs from the memory. Instead, as already seen, signal ENCY is produced by the notified processor and the reset function of signal MECOL on flip-flop 66 is, in this case, obtained from the combined effect of signal ENCY and signal PROME at logical level 0. It is now useful, for a better understanding of the invention, to reconsider as a whole the operation of the information transfer mechanism among the several processors and the memory and the notifying mechanism from a processor to another one.

Figure 6:
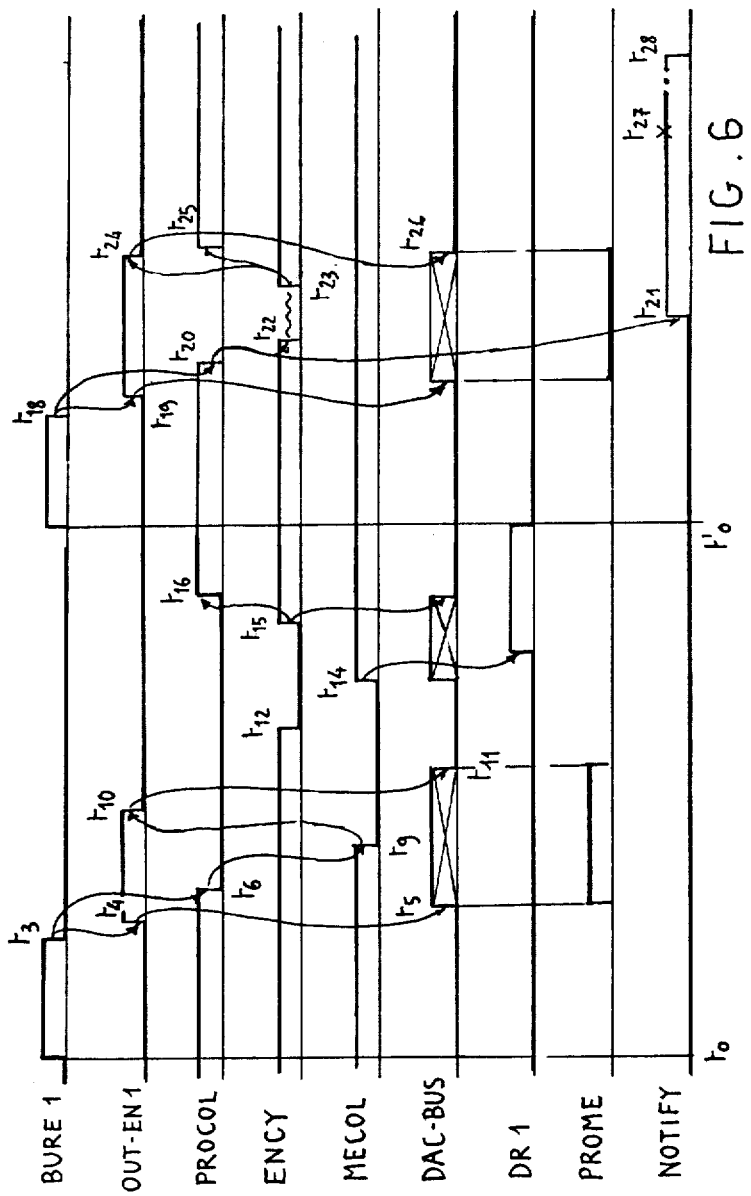
FIG. 6 shows in a timing diagram the dialogue performed on the bus in case of an operation of access to memory and in case of a notifying command between processors.

Such description is made with reference to the timing diagram of FIG. 6. Diagram BURE 1 shows the logical level present on lead 11 at the output of processor 1. Diagram PROCOL shows the logical level present on lead 8. Diagram ENCY shows the logical level present on lead 7. Diagram MECOL shows the logical level present on lead 9. Diagram OUT EN 1 shows the logical level present at the output of AND gate 74 (FIG. 4) of processor 1 dialogue unit. Diagram DAC-BUS shows the DAC-BUS state. Diagram PROME shows the state of lead 6A of the DAC-BUS. Diagram DR 1 shows the logical level present at the output of flip-flop 67 (FIG. 4) of processor 1. Diagram NOTIFY shows the logical level present at the output of flip-flop 68 (FIG. 4) to a notified processor. The chaining arrows from edge to edge of the various diagrams show the chaining of the events.

The case of the processor (processor 1) which wants to read data in working memory 4 is considered first. At an initial time $t_0$ processor 1 produces an access request: register 14 (FIG. 2) is loaded and flip-flops 25 and 66 (FIG. 4) are set. BURE 1 rises at logical level 1 and spreads along line 11. When BURE 1 is received by GAM 5 it activates, through receiver/inverter 131, NAND 135 and AND 136, the loading of register 134, the delay line 139, the set of flip-flop 138 and finally the set of flip-flop 143 which enables the several outputs of NAND gates 145, 146 and 147. In case of access requests sent at the same time by several processors, register 134 would contain such different access requests. Priority network 148 recognizes the highest priority access request (that is BURE 1). Therefore the output of NAND 145 is grounded and BURE 1 falls to logical level 0. This level 0 spreads along lead 11 and at time t3 it is received by processor 1, informing such processor that its request is accepted. The fall of BURE 1 to logical level 0, detected by receiver 34, sets flip-flop 36 activating the BUS occupation. First flip-flop 38 is set, then flip-flops 25 and 36 are reset and flip-flop 49 is set. At a time t4 OUT EN 1 rises to logical level 1 allowing the transfer of of information from register 14 onto DAC-BUS (time t5). Logical level 1 of DAC-BUS diagram shows that meaningful information is present on the DAC-BUS. Such information may comprise, for instance, a memory address and suitable commands among which a read command and a signal PROME at logical level 0 on lead 6A. For clarity, the logical level of such signal is separately evidenced as Diagram PROME.

With flip-flop 49 set, PROCOL falls to logical level 0 (time t6). When GAM 5 receives signal PROCOL at logical level 0, it resets flip-flop 143 and, as signal PROME is at logical level 1 and AND gate 164 is enabled, it loads register 102 with the information present on DAC-BUS and lowers to logical level 0 signal MECOL (time t9), starting a memory cycle (or more generally operations specified by the received information). When processor 1 receives MECOL at logical level 0, flip-flop 66 is reset and signal OUT EN 1 (time t0) falls to logical level 0 removing the information from DAC-BUS (time t11). In the other processors MECOL produces no effects. Nearabout the memory cycle end, GAM 5 lowers to logical level 0 signal ENCY (time t12). At the same time it resets flip-flop 138 (FIG. 5) and allows the recognition of pending access requests and the loading of register 134. Such operation occurs before the memory cycle is ended, so that the propagation time of signals in the priority network and associated circuits, and then along leads 11, 12 and 13 up to the processors, overlaps the cycle already in progress, so that the selected processor is already prepared to access the BUS without delay since the beginning of the new cycle. Nearabout the memory cycle end, GAM 5 raises again to logical level 1 signal MECOL (time t14) and at the same time it allows the transfer of the information contained into register 103 (for instance, data read out from memory) on the DAC-BUS. In processor 1 the new rising of MECOL to logical level 1 causes the set of flip-flop 67 with consequent loading of the information present on DAC-BUS into register 17. At the memory cycle end GAM 5 raises again ENCY to logical level 1 (time t15) and rids DAC-BUS of present information. As soon as processor 1 receives the rising edge of ENCY flip-flops 38 and 39 are reset and PROCOL rises again to logical level 1 (time t16). The ENCY rising has no effect on the other processors nor on flip-flop 66 which is already reset. The described dialogue is also used for memory write operation. In such case, besides the memory address, PROME command and write command, also the data to be written will be put on DAC-BUS. The only difference is that in such case the memory does not necessarily put on DAC-BUS a response information at the cycle end, though flip-flop 67 is however set.

The case of a processor (for instance 1) which wants to notify another processor (for instance 2) is now considered. In this case processor 1 produces, at an initial time $t_0'$, an access request to the BUS: register 14 (FIG. 2) is loaded with the suitable information (that is, processor 2 name and command PROME at suitable logical level) and flip-flops 25 and 66 are set. BURE 1 rises to logical level 1 and spreads along line 11. When BURE 1 is received by GAM 5, it activates, through receiver/inverter 131, NAND 135 and AND 136, the loading of register 14, the delay line 139, the set of flip-flop 138 and finally the set of flip-flop 143 which enables the several outputs of NAND gates 145, 146 and 147. In case of more access requests present at the same time, register 134 would contain these several access requests. Priority network 148 recognizes the access request with highest priority (that is BURE 1). Therefore the output of NAND 145 is grounded and BURE 1 falls to logical level 0. This logical 0 spreads along line 11 and at time t18 is received by processor 1 and notifies that its request is accepted. The fall of BURE 1 to logical level 0, detected by receiver 34, sets flip-flop 36 and activates the BUS occupation. First flip-flop 38 is set the flip-flops 25 and 36 are reset and flip-flop 49 (PROCO) is set. At a time t19 OUT EN 1 rises to logical level 1 allowing the information transfer from register 14 to DAC-BUS 6 (time t19). Logical level 1 of DAC-BUS 6 indicates that some meaningful binary information is present on DAC-BUS. Essentially (in this case) such information consists in the name of the notified processor (processor 2) and in signal PROME at logical level 0 on lead 6A (Diagram PROME). With the set of flip-flop 49, PROCOL falls to logical level 0 (time t20). When GAM 5 receives signal PROCOL at logical level 0 it resets flip-flop 143. No memory cycle starts because signal PROME at logical level 0 inhibits AND gate 174 (FIG. 5); so GAM 5 has completed its job. The name of notified processor present on DAC-BUS is recognized by the comparator circuit of processor 2 (corresponding to 73 of FIG. 4), so that a logical level 1 is applied to J input of flip-flop NOTI (corresponding to 68 in processor 2), through AND gate (corresponding to 81 in processor 2) and enabled by PROME at logical level 0. Signal PROCOL at logical level 0 is received by all the processors, processor 2 included, and in this last one its set flip-flop NOTI (diagram NOTIFY, time t21). In this last one it also causes the grounding for a short time of interface lead 7. Therefore ENCY falls to logical level 0 for said time interval (t22-t23). With the new rising of ENCY to logical level 1, which is detected by all the processors, processor 1 included, signal OUT EN 1 (t24) is removed on processor 1 and therefore the meaningful signals are removed from DAC-BUS (t26). In addition, always in processor 1, flip-flop 66 and flip-flop PROCO are reset. PROCOL rises again to logical level 1 (t25). At the end of this BUS occupation cycle, which is completed in a short time interval because the activation of a memory cycle is not requested, the notified processor is in a notify state with its flip-flop NOTI set. From now on processor 2 will be able, during its operation and following its own appropriate criteria, to consider the received notify signal at the most suitable time (t27) and to reset flip-flop NOTI (time t28).

Figure 7:
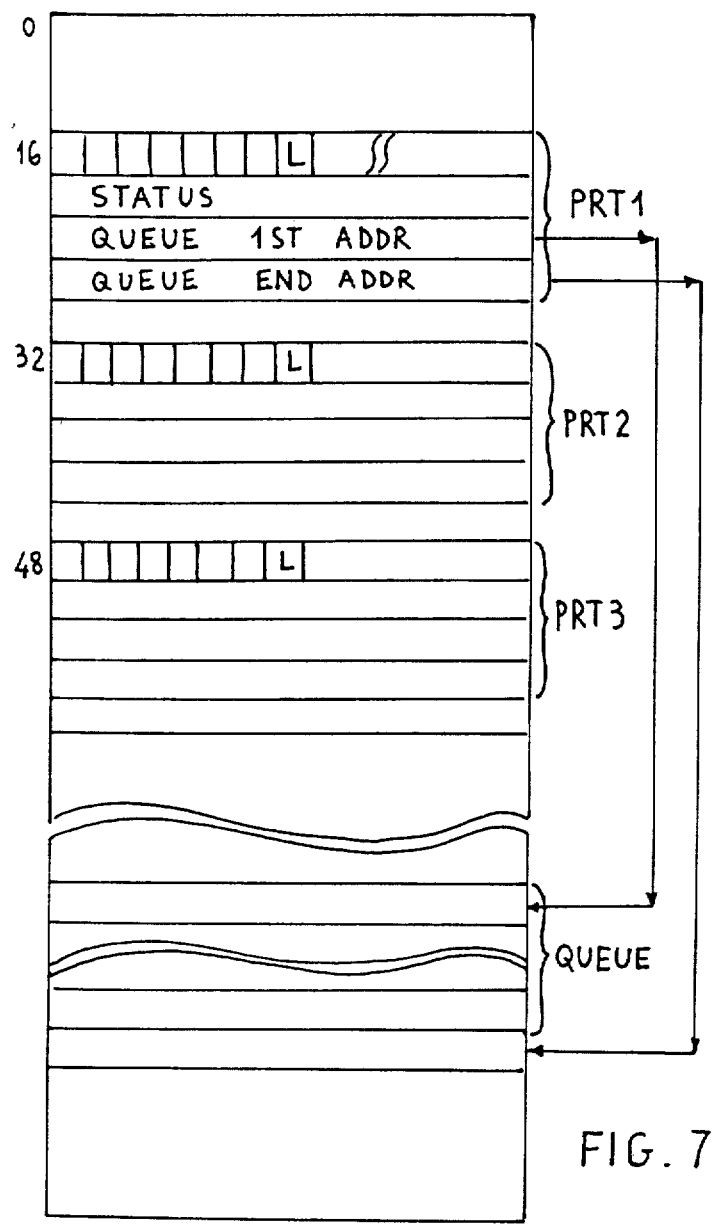
FIG. 7 shows in schematic diagram the organization of common resources located in a memory space.

Once considered how the dialogue on the system BUS is effected, both in case of information transfer from a processor to a working memory and in case of notifying signal transfer among processors, it is now useful to consider how the intercommunication among processors is obtained. In fact the intercommunication among processors requires, to be effective, that messages with suitable information content can be exchanged among processors. The exchange of a notifying signal is not enough. To this purpose, as shown in FIG. 7, the addressable memory space, for example of 64K memory positions (each one with a suitable parallelism, for instance 16 or 32 bits plus possible parity control bits), comprises memory zones dedicated to each processor located to start from memory fixed addresses. For instance memory 4 comprises a zone with addresses starting from 16 dedicated to processor 1 and named PRT1, a zone with addresses starting from 32 dedicated to processor 2 and named PRT2, and a zone dedicated to processor 3 and named PRT3. The information contained in each table is, indicatively, the following. The 1° table word includes a bit L (the eighth in FIG. 7) with function of access control to the table. Such bit, if at logical level 1, indicates that a processor is reading and updating the table and that the other processors cannot have access to the same table. Bit L is raised to logical level 1 by the processor which accesses the table and is lowered to logical level 0 by the same processor. Other bits can be used as control and error correction bits. The 2° table word contains status indicator bits. For instance a bit can indicate, when at logical level 1, that a program or a service which must be executed by the notified processor has been "queued" or arranged in a queue. Another bit can indicate that at least one of the peripherals coupled with a processor has pending a disconnect request. The 3° table word contains a "QUEUE STARTING POINTER" of pending programs/services, that is, the memory position where it is stored, the beginning address of the first program or service which must be executed by the processor which the table is dedicated to. The 4° table word contains a "QUEUE ENDING POINTER" of pending programs/services, that is, the position memory address immediately following the one where the last word is stored of the last program/service intended for the processor which the table is dedicated to. Other table words may contain other queue pointers, for instance, an executed service queue, a queue of services to be cancelled, and others. The "QUEUE STARTING POINTER" and the "QUEUE ENDING POINTER" of each processor table, PRTi, define as many memory zones QUEUEi, of variable length, which contain, in an orderly sequence or by indirect reference from a service to the other, all the programs/services intended for a processor. It is in processor PRTi table and in QUEUEi that the messages intended for the several processors are completely stored.

Figure 8:
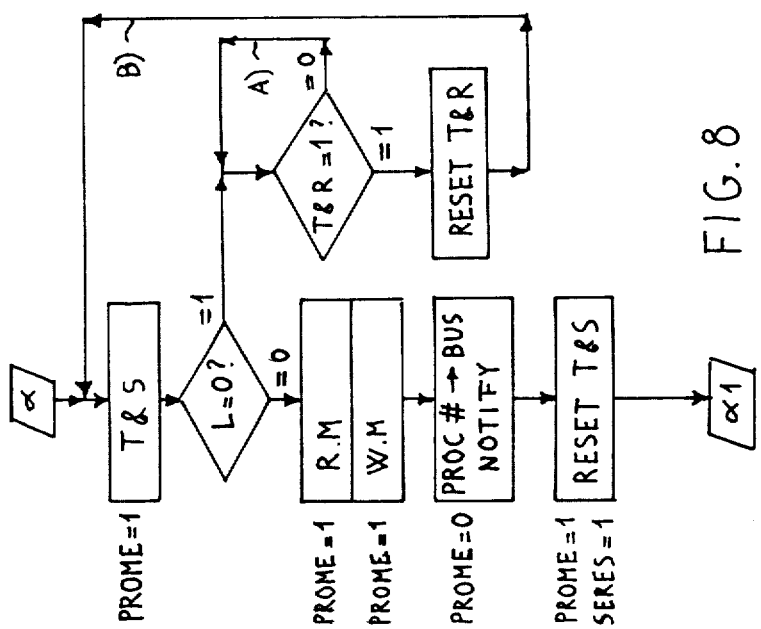
FIG. 8 is a flow diagram of the operations carried out by a processor for storing a message addressed to another processor in common memory resources and for notifying it of such action.

FIG. 8 shows in flow chart format the operations that a processor i executes for storing into memory a message intended for a processor J and consisting, for instance, in the command to begin a program and to send a notifying signal to it. Starting from an initial condition where a notify operation (indicated with a) is needed, processor i activates a microprogram which runs as follows. First of all a TEST & SET (T&S) command is sent to the memory by an access memory operation which involves the already seen procedure. PROME signal on the interface will be at logical level 1. T&S command is accompanied on the BUS by the address of first PRTj word (processor table the access to which is required) and it requests the combined operation of reading the first PRTj word and of rewriting the same word raising locking bit L to logical level 1 if it already was not. Therefore at the beginning of the dialogue a bit L=1 is put as data to be written on DAC-BUS. At the memory cycle end, at about the end of the dialogue, the memory put on DAC-BUS the information read out and previously contained into the first PRTj word. Such information is examined by processor 1. If bit L is at 0, that means that PRTj was not occupied and that processor i has taken access to it; it can therefore go on with its dialogue with the memory reading the second PRTj word. The information therein included is examined by processor i and if necessary updated with a new message. If at least a program is present in QUEUEj, processor i reads the fourth PRTj word obtaining the address of QUEUEj end. At this point, it can, by means of subsequent write operations beginning from the received address, add to memory QUEUEj the program instruction for processor j. The last address used, increased by 1, is then written on the fourth PRTj word. Thus the queue end address is updated.

All these operations occur with a dialogue between processor and memory; the PROME signal is therefore at logical level 1. At this point a signal NOTIFY is sent to processor j putting on DAC-BUS the name of processor j, NOTIFY signal, at logical level 1 and PROME signal at logical level 0. Flip-flop 68 in processor j is therefore set. As microprogram ends, processor i sends a RESET T&S command to memory. Owing to such command first PRTj word is addressed and bit L is lowered to logical level 0, so leaving PRTj and QUEUEj resources free to be used by the other processors. Such command is accompanied by PROME signal at logical level 1. Such command is further accompanied by a SERES signal at logical level 1. This signal, besides the memory, is received by all the processors connected to the BUS and, during the dialogue on the BUS, with the fall of PROCOL to logical level 0, it sets the flip-flop corresponding to 88 of FIG. 4 in all the processors. At the end of BUS occupation cycle, with ENCY rising again to logical level 1, in all the processors the flip-flop T&R (corresponding to 69 of FIG. 4) is therefore set. This signals to all the processors that at least some resources previously occupied have been set free. The importance of such signal is clear. In fact, if a processor i, which wants to access the resources dedicated to processor j (PRTj) into memory, with a TEST & SET operation finds the resources occupied, it must generally try again to access such resources repeating the T&R command until it finds that such resources are free. Each T&S operation involves a memory access and therefore a BUS occupation which is competitive and prejudicial to the BUS utilization by the other processors. This is avoided by means of the described signal.

Considering again the flow chart of FIG. 8, it can be seen that, after a first T&S operation, processor i examines the logical level of bit L. If L=1 no further access attempts are made, but processor i examines the state of its T&R flip-flop. Sch operation does not involve the BUS occupation, but occurs inside the processor. If T&R is reset (T&R=0) the processor goes on cyclically testing the state (path A). If T&R is set, which occurs when some common resources, that is, any of the processor table PRT is set free by any one of the processors, flip-flop T&R is set. At this point processor i executes a T&S operation again (path B) resetting with microcommand MP its flip-flop T&R. If the resources set free are the one to which processor i wants to access, the notifying process can be concluded. If the resources set free are not the one to which processor i wants to access (L=1), processor i will start again examining the state of its flip-flop T&R until this one is set again. In this case the operation cycle goes on until the requested resources are effectively available and involves a reduced number of memory occupation cycles.

Figure 9:
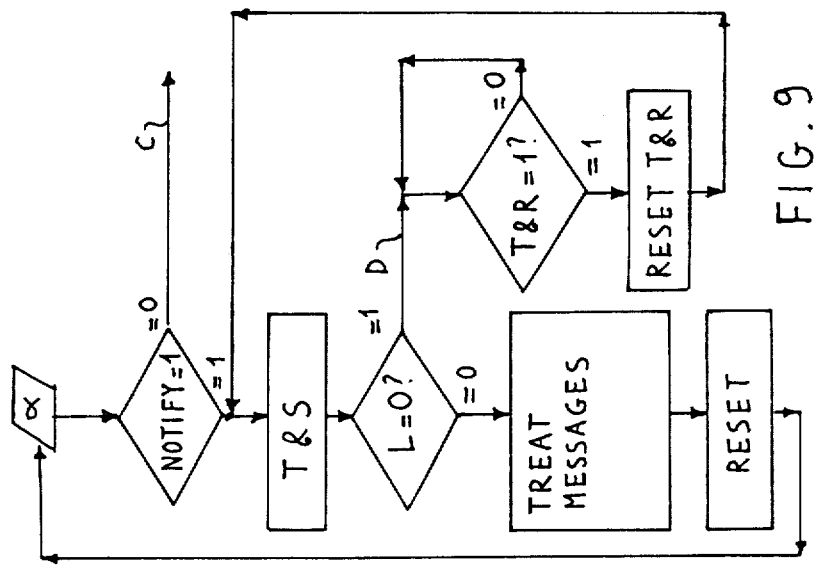
FIG. 9 is the flow diagram of the operations carried out by a processor, in answer to a notifying signal, for accessing the common memory resources and reading the message intended for it.

Once described in the whole the notifying operation among processors and the apparatus which performs it, it is possible to complete such description showing how the notified processor answers to the notifying signal. FIG. 9 shows in flow chart the operations performed by the notified processor. At the beginning of each microprogram to be executed, indicated with α, each processor examines the state of flip-flop NOTI. If NOTI is reset (NOTIFY=0) the microprogram must be normally executed (path C). If NOTIFY=1 the microprogram jumps to a routine of the notifying signal treatment. Such routine involves: 1°-a T&S operation of the memory to the fixed beginning address of the PRT table dedicated to processor j; 2°-bit L examination. If L=0 processor j accesses to the PRTj resources and reads the types of messages addressed to it and defined by the second PRTj word, it decides, on appropriate criterium basis, which type of message to consider first and, consequently, it completes the requested information finding entering a queue, for instance QUEUEj. Then it begins the treatment of the received messages updating or putting at zero the beginning/end queue pointers and the message type pointers of 2° PRTj word. All these operations, which can change from processor to processor and from message to message, are schematized with the TREAT MESSAGES operating block. Finally, if no messages to be treated are still in the dedicated resources, it resets its flip-flop NOTI by a microcommand MB, and by a reset command sets its dedicated resources free starting again the execution of the initial microprogram or starting the execution of the program/services it was required to begin. The 3°-If instead L=1 processor j begins to examine the state of its flip-flop T&R (path D) until this one is set (T&R=1). At this point processor j tries again an access operation to the dedicated resources and so on until the access is obtained.

What is claimed is:

1. A multiprocessing system comprising a plurality of processors and a memory unit coupled to each other through a common bus to which each processor can gain access on request for an information exchange with said memory unit or for notification to another of said processors, said memory unit comprising:
a control section for granting bus access to one of said processors at a time on a priority basis and on request from said processors respectively;
a plurality of storage resources, each one related to one processor and accessible by all the processors for receiving and storing messages intended for the related processor;
timing means activated by a control signal received through a first bus lead for starting one memory cycle and for generation of a first end signal on a second bus lead on termination of said memory cycle;
said each processor comprising:
first means set by the bus access granted to said processor for loading said first bus with said control signal starting a memory cycle and holding said bus until reset by a signal received from said second bus lead;
second means for generating signals representative of its own processor name;
third means for loading third bus leads with signals representative of the name of a processor to which messages are intended to be notified, along with a notification signal;
fourth means for receiving through said third bus leads a signal representative of the name of a notified processor and said notification signal;
a comparator coupled to said second and said fourth means for comparing its own processor name with said notified processor name and for generating a notify signal when said names are equal;
storing means for storing said notify signal so that the notified processor is autonomously able to recognize said notify signal in said storing means at any time, without requiring attention of the notifying processor;
fifth means for the generation of a second end signal on said second bus lead concurrently with the storing of said notify signal in said storing means for resetting said first means in a notifying processor;

said memory further comprising:

sixth means for receiving said notification signals through one of said third bus leads and for inhibiting in response thereto the activation of a memory cycle by said control signal;

said plurality of storage resources each being operative to receive messages from said procesors intended for its related processor and to store said messages therein until access by its related processor upon said recognition of the notify signal in its related processor.

* * * * *